Nov. 29, 1955  F. N. G. KRANICK  2,725,151
FORAGE CONTAINER
Filed Feb. 17, 1950  5 Sheets-Sheet 2
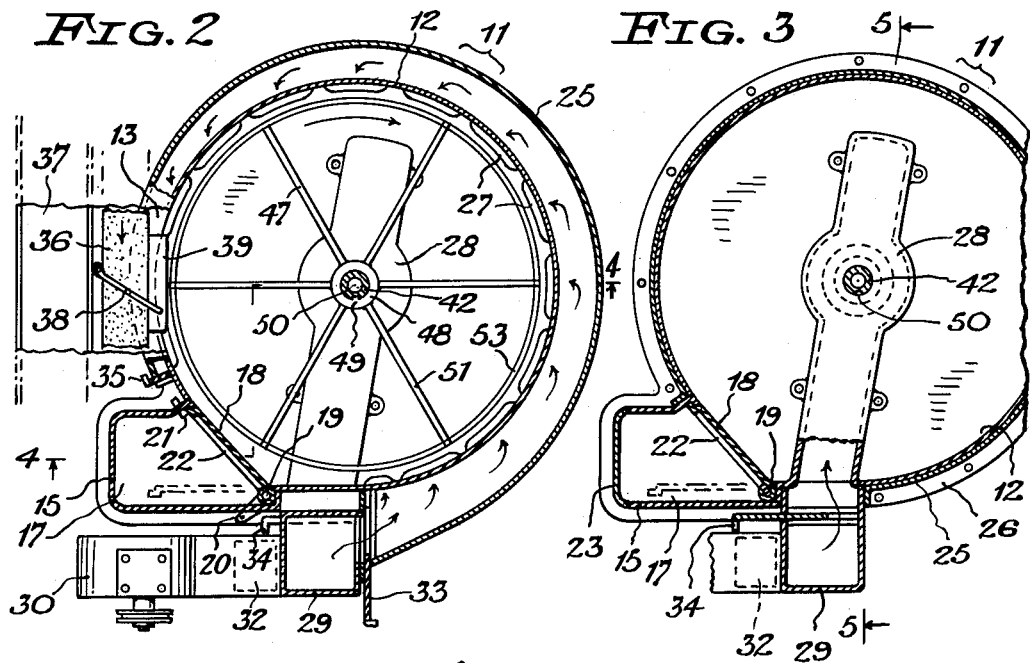
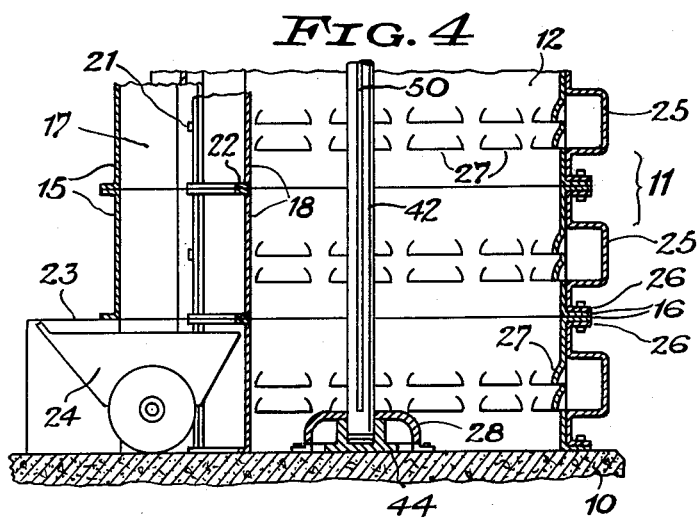
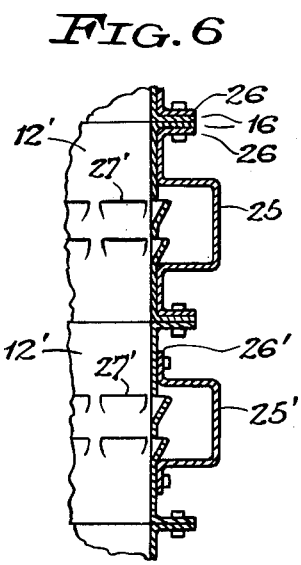
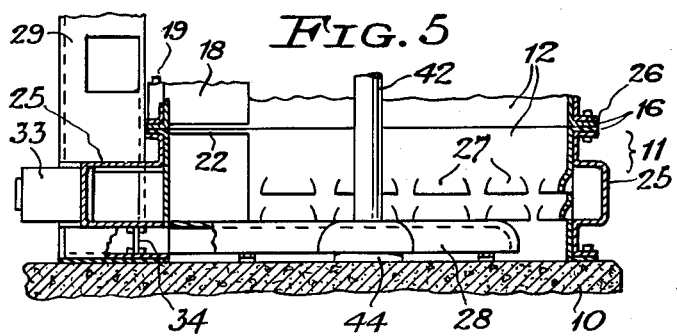
INVENTOR
FRANK N. G. KRANICK
BY Christopher L. Vaal
ATTORNEY Nov. 29, 1955  F. N. G. KRANICK  2,725,151
FORAGE CONTAINER
Filed Feb. 17, 1950  5 Sheets-Sheet 3
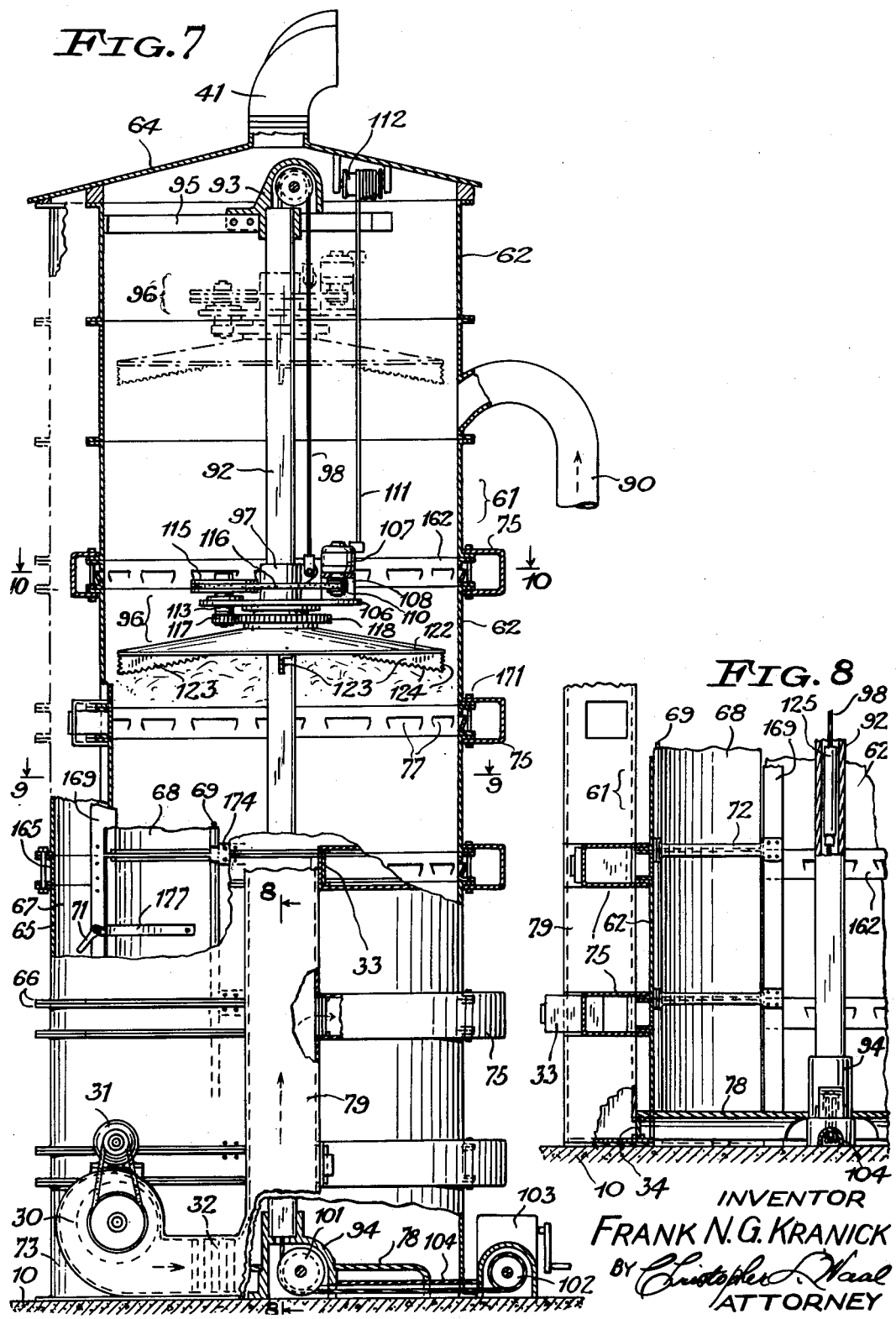
INVENTOR
FRANK N. G. KRANICK
BY Christopher L. Naal
ATTORNEY INVENTOR
FRANK N. G. KRANICK
BY Christopher L Waal
ATTORNEY Nov. 29, 1955 F. N. G. KRANICK 2,725,151
FORAGE CONTAINER
Filed Feb. 17, 1950 5 Sheets-Sheet 5
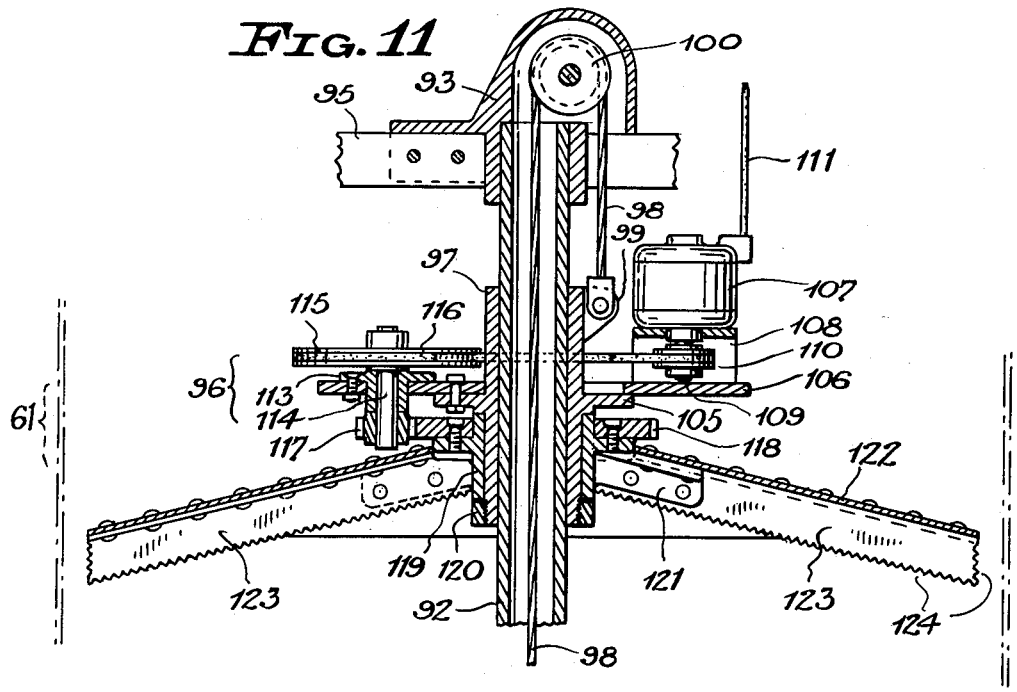
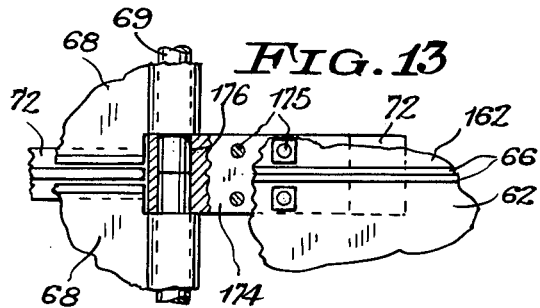
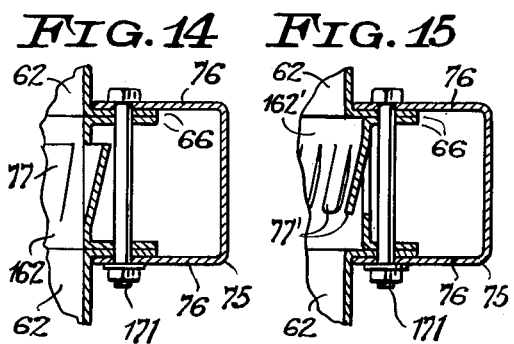
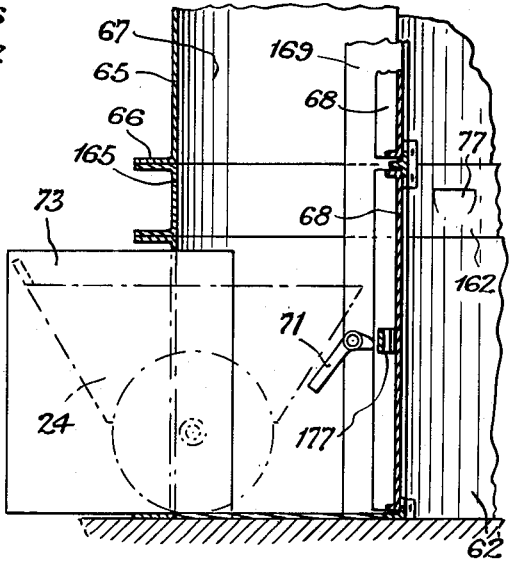
INVENTOR
FRANK N. G. KRANICK
BY Christopher L. Waal
ATTORNEY

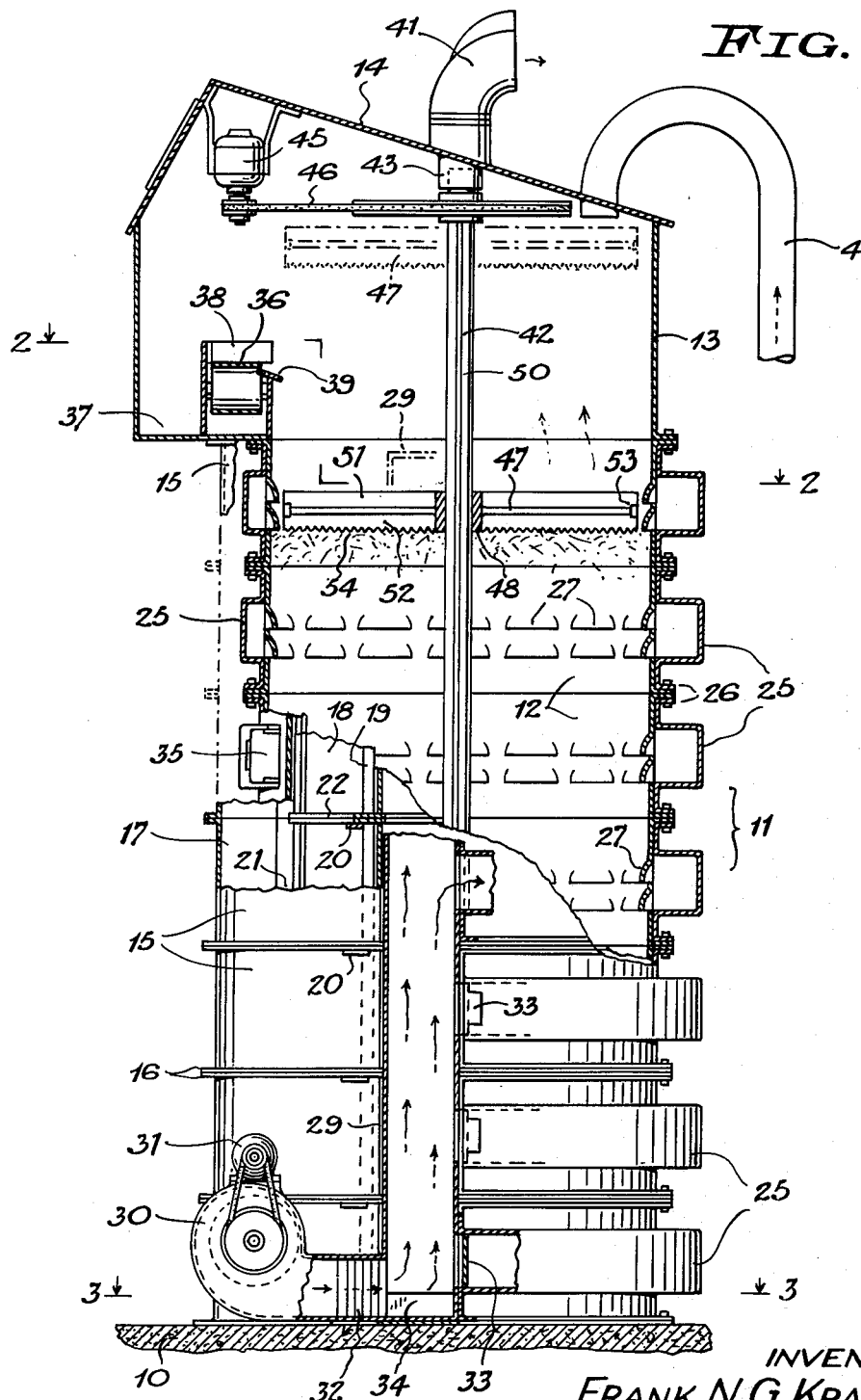

United States Patent Office 2,725,151
Patented Nov. 29, 1955

2,725,151
FORAGE CONTAINER
Frank N. G. Kranick, Racine, Wis.

Application February 17, 1950, Serial No. 146,121

5 Claims. (Cl. 214—17)

The present invention relates to apparatus for storing and handling forage.

An object of the invention is to provide a forage container or bin including improved casing means of simple and durable construction adapted to form both a storage compartment and a discharge passage.

Another object is to provide a forage container having improved means for discharging or dispensing the forage.

A further object is to provide a forage storing apparatus which is of relatively inexpensive construction and capable of easy erection.

A still further object is to provide a forage container including casing sections which can be easily assembled and which are so arranged as to facilitate admission of drying air to the container.

The invention further consists in the several features hereinafter described and claimed.

In the accompanying drawings, illustrating certain embodiments of the invention, Fig. 1 is a sectional elevational view of one form of forage container constructed in accordance with the invention;

Fig. 2 is a transverse sectional view of the container taken generally along the line 2—2 of Fig. 1;

Fig. 3 is another transverse sectional view taken generally along the line 3—3 of Fig. 1;

Fig. 4 is a sectional elevational view of the lower part of the container taken generally along the line 4—4 of Fig. 2;

Fig. 5 is another sectional elevational view of the container taken generally along the line 5—5 of Fig. 3;

Fig. 6 is a detail sectional view of a modified form of container wall construction;

Fig. 7 is a sectional elevational view generally similar to Fig. 1 and showing another form of forage container;

Fig. 8 is a fragmentary sectional elevational view taken generally on the line 8—8 of Fig. 1;

Fig. 11 is a sectional elevational view of a discharger for the container;

Fig. 12 is a fragmentary sectional elevational view taken generally on the line 12—12 of Fig. 10;

Fig. 13 is a fragmentary detail view of a door hinge construction, parts being shown in section;

Fig. 14 is a detail sectional view of part of the wall construction of the container of Fig. 7;

Fig. 15 is a view similar to Fig. 14 but showing a further modified wall construction, and Fig. 16 is a fragmentary detail view of one of the wall casing members of Fig. 15.

Figure 9:
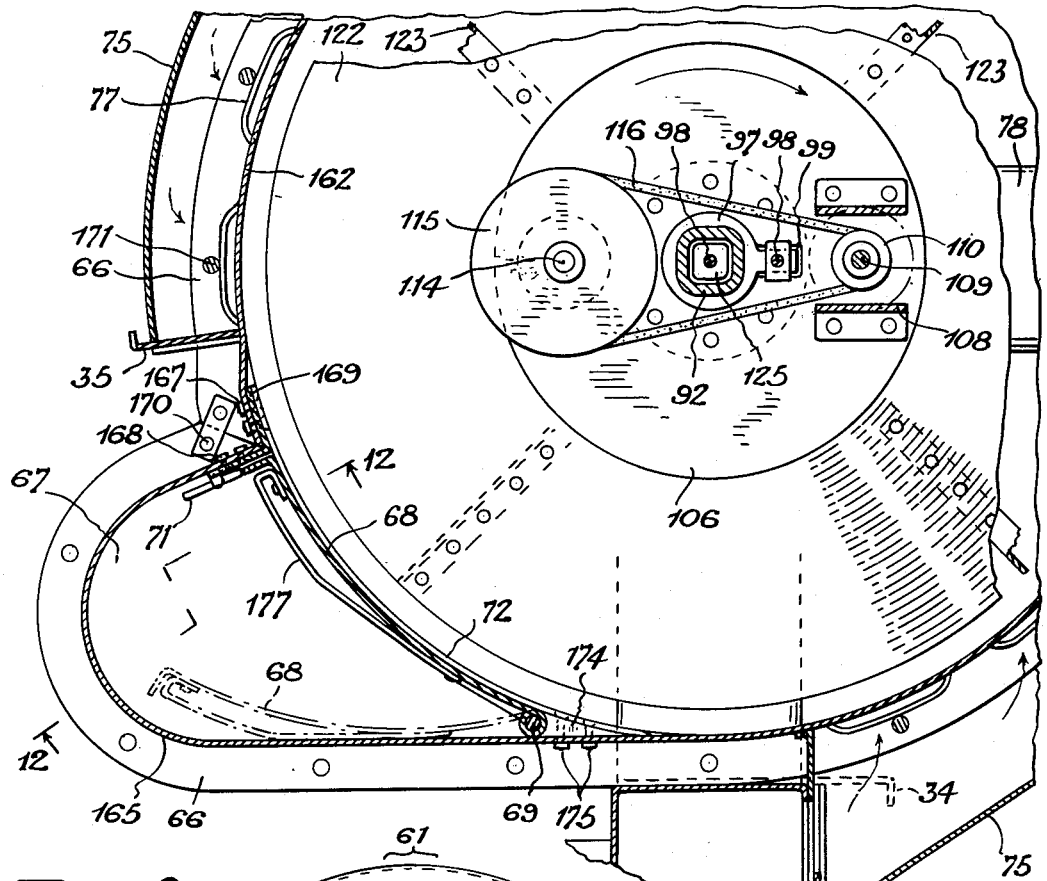
Fig. 9 is a transverse sectional view taken generally on the line 9—9 of Fig. 7.

Referring to the form of the invention shown in Figs. 1 to 5 of the drawings, 10 designates a suitable base, such as of concrete, and 11 designates generally a vertically elongated storage container for hay or other forage.

The container comprises a plurality of superposed casing sections 12 and a top casing section 13 which are rigidly connected together and which define the side walls of the container, the top casing section having a roof 14. The casing sections 12 and 13 are formed of suitable material, such as metal, and the former are of generally annular shape with respective lateral extensions 15, there being out-turned peripheral attaching flanges 16 at the abutting edges of the several casing sections. The extensions 15 project tangentially of the casing sections 12, Figs. 2 and 3, and are vertically aligned to form a vertical discharge chute or duct 17. The main body of the container is of cylindrical shape and is separated from the discharge chute 17 by gates or doors 18 on the respective casing sections 12, each gate being swingable on a vertical axis at 19, and there being a suitable operating arm 20 and latch or retainer 21 for each gate. In some instances, the casing sections 12 may be provided with narrow horizontal bars 22 forming partitions between the gate openings. The lowermost casing projection 15 has a door 23, Fig. 4, for the removal of discharged material, as by means of a cart 24 which receives the falling material.

Extending partially around each casing section 12 is an air duct 25, preferably scroll-shaped, with the intake end larger than the closed end, the discharge gate 18 of the casing section intervening between the ends of the duct. Each air duct has out-turned peripheral connection flanges 26 which are bolted or otherwise secured to the casing flanges 16. This construction permits attachment and removal of the ducts without dismantling the container or requiring access to the inside of the container. Each casing section 12 is provided in its vertical side wall with a series of horizontal vent slots or louvers 27 for discharging air from the duct 25 into the container, these louvers being so shaped as to minimize entrance of forage material into the duct. A floor duct 28 extends diametrically of the container along the base 10 and has its lower edges spaced from the base for the discharge of air into the container. If desired, the floor duct may have louvers (not shown) like those of the side wall ducts.

The intake ends of the ducts 25 and 28 communicate with a vertical header or pressure stack 29, the lower end of which is connected to a blower 30 driven by a suitable source of power such as an electric motor 31. In some instances, a conditioner 32 for heating or dehumidifying the air, or for both treatments, is placed in the discharge of the blower casing. Instead of air, a heated non-oxidizing gas, such as flue gas, or a mixture of air and gas, may be supplied by the blower. If desired, the blower may serve a plurality of forage containers.

Movable gates or dampers 33 are placed at the intake ends of the respective air ducts 25 for selectively controlling the flow of air through these ducts, and a movable gate or damper 34 is placed at the intake end of the floor duct 28 to control the flow of air through this duct. The small end of each side wall duct 25 is normally closed by a gate or damper 35, Figs. 1 and 2, which when opened will permit any loose material deposited in the duct to be blown out by air pressure in the duct.

The top casing section 13 is provided at one side with a conveyer belt 36 and an operator's platform or catwalk 37. A pivoted gate or deflector 38 extends at an angle across the upper run of the belt for causing forage material on the belt to be discharged into the container, the falling material passing along an inclined chute board 39. If desired, the conveyer belt and catwalk may serve a plurality of forage containers, in which case the pivoted gate 38 provides a selective discharge means, this gate being swung between active and inactive positions.

Forage material, especially in the case of light chopped material, may also be fed into the conveyer by blowing it through a feed pipe 40 connected to the top casing section. The roof of the container may be provided with a suitable ventilator 41 which in some instances may be of the eduction type.

A vertical shaft 42 extends centrally in the container and is suitable journalled at its upper and lower ends in bearings 43 and 44. The shaft is driven by any suitable source of power, such as an electric motor 45 having a belt drive connection 46 with the shaft. A light-weight discharging or unloading rotor 47 has a hub 48 slidably but drivingly mounted on the shaft, as by a key projection 49 on the hub fitting in a keyway 50 in the shaft. The rotor is of skeleton form and has upper and lower radial vanes 51 and 52 connected to a circular rim 53, the vanes 51 forming fan blades and the vanes 52 having teeth 54 to loosen the packed forage in the container. The rotor rests lightly on the top of the forage and when rotated in a clockwise direction as viewed in Fig. 2 serves to blow or fan the loosened forage into the tangential discharge extensions 15 of the casing sections, the doors 18 at the discharge level being open during this operation. Since the ducts 25 are at the outer sides of the annular casing sections 12, the rotor periphery can be brought reasonably close to the inner walls of these casing sections. During loading of the container the rotor is held in its uppermost position shown in dotted lines in Fig. 1, as by a block-and-tackle, not shown.

The container 11 serves to store hay, stover or other forage which is delivered into the container by the conveyer belt 36, or in some instances by the feed pipe 40. The forage may have a moisture content which is too high to permit safe storage and in such case the material in the container is dried to an extent permitting safe storage. After forage is deposited in the container to a depth of a few feet, the gate or damper 33 of the lowermost side wall air duct 25, and also the gate or damper 34 of the floor duct, are opened; and the gaseous drying medium (natural air, warmed air, or gas) is delivered to the header or stack 29 by the blower 30 for a sufficient length of time to obtain the desired degree of dryness. As more material is deposited in the container, which may occur at different times during the day, or on different days or even different weeks, and as the material in the lower region of the container is reduced to the desired degree of moisture content, the gates 33 and 34 of the lowermost side wall duct and floor duct are closed, and a gate of a higher side wall duct is opened, permitting drying air to be forced through the upper material. As the mass of material being dried or aerated at any one time is limited in amount, the resistance to air flow is kept low, thus avoiding excessive power consumption in moving the air. The gated ducts permit the air to be introduced into the forage mass in the container at different levels as needed and also permit proper aeration of the material regardless of the extent of filling of the container.

When air is introduced into the container from one of the higher side wall ducts 25 it is not always necessary to close the gates of the lower ducts, as the increased resistance to air flow in the lower parts of the material will limit the air flow therein and cause most of the air to flow into the container from the highest open duct.

After the loading operation is completed, the rotor 47 is lowered onto the top of the material, and when material is to be unloaded the gate or door 18 nearest the top of the material is opened, whereupon the rotor is rotated by the motor 45, causing a loosening of the material, if packed, and fanning the material into the discharge duct 17 where it falls into a suitable receptacle such as the cart 24.

The loading and discharging means for the forage material may also be embodied in similar forage containers such as silos.

The modified container wall construction shown in Fig. 6 includes casing sections 12' which are similar to the casing sections 12 except that the former include louvers 27' which project outwardly, avoiding projections in the storage compartment and either providing more clearance space for the vaned discharging rotor 47 or permitting the use of a larger rotor. The lower casing section 12' of Fig. 6 has an air duct 25' with flanges 26' secured to the vertical walls of the casing section.

In the modified form of apparatus shown in Figs. 7 to 14, the base 10 has mounted thereon a storage container 61 generally similar to the container 11. The container 61 comprises a plurality of superposed rigidly connected casing sections 62 and 162, the uppermost casing section having a roof 64. The casing sections 62 and 162 are formed of suitable material, such as sheet metal or plate, and are of generally annular shape with respective lateral extensions 65 and 165, there being out-turned peripheral attaching flanges 66 at the abutting edges of the several casing sections. The extensions 65 and 165 project tangentially of the casing sections and are vertically aligned to form a vertical discharge chute or duct 67. The main body of the container is of cylindrical shape to form a storage compartment and is separated from the discharge chute by marginally flanged sheet metal gates or doors 68, as hereinafter described. One of the casing sections 62 forms the bottom portion of the container and has a door 73, Fig. 12, for the removal of discharged material, as by means of a cart 24.

Figure 10:
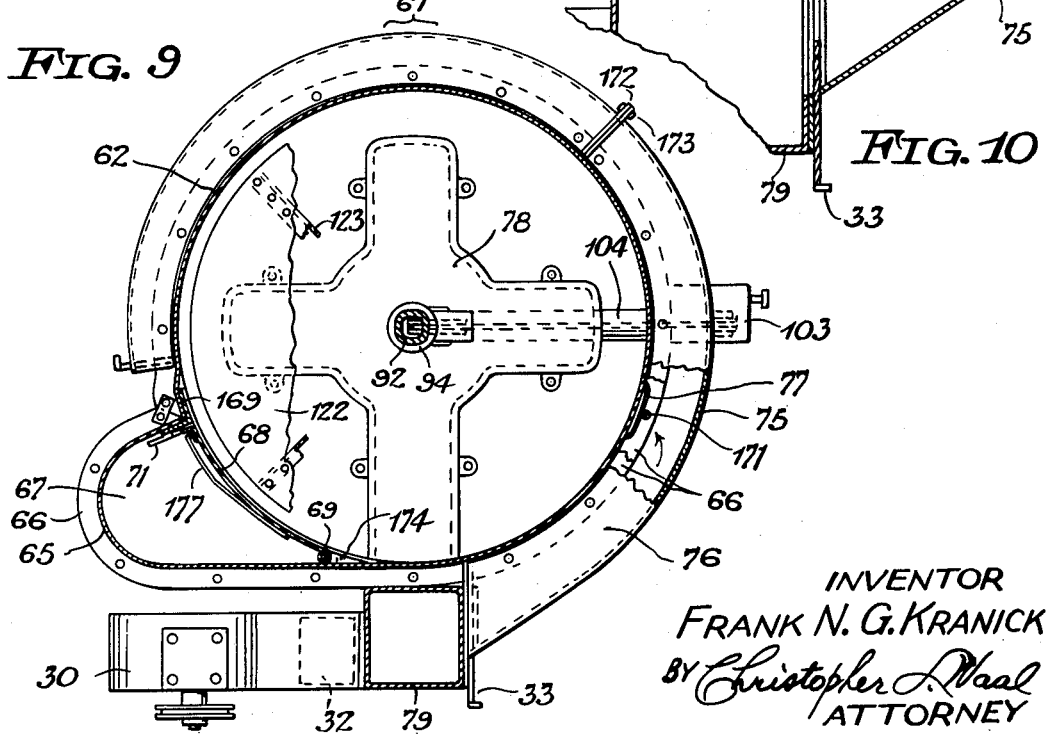
Fig. 10 is a view generally similar to Fig. 9 but on a larger scale, taken generally on the line 10—10 of Fig. 7.

Each of the peripherally flanged casing sections 62 and 162 has the general shape of a fan housing, as seen in Figs. 9 and 10, and preferably consists of a length of sheet metal bent to channel shape and having inwardly converging ends meeting approximately at right angles and secured as by bolts 167 and 168 to the flanges of an upright angle bar 169. In some instances, the ends of each casing section may also be secured together by welding or by bolts 170. The angle bar 169 may be as long as the height of the stack of casing sections, although if desired it may be subdivided into shorter lengths.

The loop-shaped casing sections 162 are preferably considerably shorter in height than the casing sections 62 and are here shown to be arranged alternately with the latter casing sections. Each casing section 162 is provided with a series of horizontal vent slots or louvers 77 for admitting air into the storage compartment. Extending partially around each casing section 162 is an air duct 75, preferably scroll-shaped, with the intake end larger than the discharge end, the discharge chute 67 of the container intervening between the ends of the duct. Each air duct 75, Fig. 14, is of channel-shaped cross-section and has apertured top and bottom flanges 76, the top flange 76 overlying the bottom peripheral flange 66 of the next higher casing section 62, and the bottom flange 76 underlying the top peripheral flange 66 of the next lower casing section 62. The assembly is secured together by vertical bolts 171 which are longer than the height of the air duct 75 and pass through the air duct and the casing flanges 66. If desired, the air duct may be formed in two tandem sections, as seen in Fig. 9, the sections having abutting end flanges 172 secured together by bolts 173.

A floor duct 78, Figs. 8 and 9, of branched shape, has its lower edges spaced from the base for the discharge of air into the container. The floor duct 78 is generally similar to the floor duct 28 of Fig. 3.

The intake ends of the air ducts 75 and 78 communicate with a vertical header or pressure stack 79 which is supplied with air as in the apparatus of Fig. 1, the construction including a blower 30, a driving motor 31 therefor, and a conditioner 32. The air ducts are provided with suitable dampers 33, 34, and 35 as in the structure of Fig. 1. A ventilator 41, like that of Fig. 1, is mounted on the container roof 64.

Forage material, such as chopped hay or other crop, is loaded into the container in any suitable manner, as by blowing it through a feed pipe 90 connected to the side wall of the container near the top of the container.

The gates or doors 68 are of arcuate shape to conform generally to the cylindrical main portion of the container, and each door is here shown to have a height slightly less than the combined height of a pair of adjacent casing sections 62 and 162, as seen in Figs. 8 and 12. The lowermost door extends from the point near the base 10 to a point near the top of the lowermost casing section 162, Fig. 12. Each door has at one side edge a vertical pintle rod 69, the opposite ends of which are mounted in wedge-shaped hinge blocks 174, Figs. 10 and 13, secured as by bolts 175 to the vertical tangential walls of some of the casing sections, the large end of each wedge block having a vertical bore 176 receiving the pintle ends. Certain of the casing sections are provided with narrow arcuate horizontal tie bars 72, such as of T-shaped cross-section, forming partitions and door stops between the door openings. One end of each tie bar 72 is secured by a set of the hinge block bolts 175, and the other end is secured by a set of the angle bar bolts 167. Each intermediate tie bar 72 is here shown to be bolted to vertically adjacent casing sections 62 and 162. Each door 68 is held in closed position by a manually releasable latch or retainer 71 pivotally mounted on the upright angle bar 169. A ladder bar 177 is bolted or riveted to each door. At a region adjacent the hinge pintles 69 the vertical side wall portion of the discharge chute 67 forms a tangential continuation or projection of the cylindrical wall of the main body of the storage container.

A stationary tubular column or pillar 92, here shown to be of generally square cross-section, extends centrally in the container and is supported at its upper and lower ends by a head frame member 93 and a base frame member 94, the head frame member being carried by radial arms 95 secured at their outer ends to the container walls, and the base frame member resting on the concrete base 10.

A discharging or unloading device 96 is vertically movable in the storage compartment of the container 61 and includes a support-forming sleeve 97 slidably but non-rotatably fitting on the column 92 and suspended in vertically adjusted position by a chain or cable 98 connected to an ear 99 on the sleeve. The cable passes over a sheave 100 rotatably mounted in the head frame member 93 and passes downwardly through the column 92, thence around a sheave 101 rotatably mounted in the base frame member 94, Fig. 7, and radially outwardly to the winding drum 102 of a winch 103 at the exterior of the container, the radially extending portion of the cable being enclosed in a housing 104.

The vertically slidable sleeve 97 has an annular flange 105 to which is bolted a horizontal plate or disk 106. An electric motor 107 is carried on the plate by a pedestal bracket 108 and has a vertical shaft 109 with a pulley 110 at its lower end. The motor is supplied with current through a flexible conductor cable 111 passing over a take-up reel 112 at the upper portion of the container 61. A bearing member 113 is bolted to the plate 106 at a region diametrically opposite the motor and has journalled therein a vertical shaft 114 which carries at its upper end a pulley 115 connected by a V-belt 116 to the motor pulley 110. The lower end of the shaft 114 carries a pinion 117 which meshes with a gear 118 secured to a flanged hub member 119 rotatably fitting on the sleeve, the hub member being supported by a nut 120 at the lower end of the sleeve. The hub member has radial arms 121 on which a rotor disk 122 is secured, the disk being here shown to have an upwardly converging conical shape. To the lower side of the rotor disk are secured several radial blades or vanes 123 which have teeth 124 along their lower and outer edges, the blades or vanes forming fanning and scraping elements. The discharging rotor thus formed is rotated by the motor 107 in a clockwise direction as viewed in Fig. 10.

The discharging device is preferably of light weight construction and if desired may be counterweighted, as by a weight 125, Fig. 8, attached to the cable 98 and vertically movable in the tubular column 92, both the column and the weight being non-rotatable.

The modified container wall construction shown in Figs. 15 and 16 is generally similar to that of Fig. 14 and includes a casing section 162' with inwardly projecting vent-forming tongues 77', the vented portions of the vertical wall of the casing section 162' being offset outwardly from the vertical walls of the casing sections 62.

As in the apparatus of Fig. 1, the container 61 of Fig. 7 serves to store hay, stover, or other forage which is delivered thereto as by the feed pipe 90. During the feeding operation the discharging device 96 is suspended near the top of the container, as indicated by broken lines in Fig. 7. The forage is dried in the manner carried out with the apparatus of Fig. 1.

After the loading and drying operations are completed, the discharging rotor is lowered onto the top of the material, where it lightly rests. When forage material is to be unloaded the gate or door 68 nearest the top of the material is opened, the attendant climbing up in the discharge chute 67 for this purpose. The rotor is then driven by the motor 107, causing a loosening of the material, if packed, and forcing the material around the storage compartment of the container and in a tangential direction into the discharge chute 67 where it falls onto the floor or into a suitable receptacle such as the cart 24.

The present application constitutes a continuation-in-part of my application Serial No. 612,008, and now Patent No. 2,605,692 for Method and Apparatus for Storing Forage, filed August 22, 1945.

What I claim as new and desire to secure by Letters Patent is:

1. In a forage container, an upright casing having a storage compartment and a lateral discharge chute and movable closure means between said compartment and chute, said closure means being movable outwardly into said chute, a non-rotatable column of non-circular cross-section disposed centrally in said compartment, and a forage discharging device vertically guided by said column, said device including a support slidably but non-rotatably fitting on said column and a rotary forage-impelling member rotatably carried by said support.

2. In a forage container, an upright casing having a storage compartment and a lateral discharge chute and movable closure means between said compartment and chute, said closure means being movable outwardly into said chute, a non-rotatable column of non-circular cross-section disposed centrally in said compartment, a forage discharging device vertically guided by said column, said device including a support slidably but non-rotatably fitting on said column and a rotary forage-impelling member rotatably carried by said support, and flexible suspension means for said discharging device connected to said support.

3. In a forage container, an upright casing having a storage compartment and a lateral discharge chute and movable closure means between said compartment and chute, said closure means being movable outwardly into said chute, a central, stationary, upright tubular member of non-circular cross-section disposed in said compartment, a forage discharging device vertically guided by said tubular member, said device including a support slidably but non-rotatably fitting on said tubular member and a rotary forage-impelling member rotatably carried by said support, and a flexible suspension member for said discharging device connected to said support and including a non-rotatable portion extending in said tubular member.

4. In a forage container, an upright casing having a storage compartment and a lateral discharge chute and movable closure means between said compartment and chute, a central, stationary, tubular column of non-circular cross-section in said compartment, a sleeve vertically slidable on said column and restrained against rotation by said column, a vaned discharging rotor rotatably carried on said sleeve and engageable with the top portion of the forage for urging the forage into the discharge chute, power means carried by said sleeve for driving said rotor, and elevating means for said sleeve including a portion extending in said stationary column.

5. In a forage container having a generally cylindrical storage compartment and a lateral chute-forming discharge passage and movable closure means between said compartment and passage, a discharging device comprising a non-rotatable support, means for guiding said support for vertical travel in said compartment, a material-impelling rotor carried by said support and being approximately coaxial with said compartment, and power-operated rotor-driving means carried by said support.

References Cited in the file of this patent

UNITED STATES PATENTS

| | | |
|---|---|---|
| 1,046,456 | Freeland | Dec. 10, 1912 |
| 1,060,745 | Cratsly | May 6, 1913 |
| 1,068,176 | Scott | July 22, 1913 |
| 1,269,668 | Wolcott | June 18, 1918 |
| 1,740,250 | Kutz, Sr., et al. | Dec. 17, 1929 |

FOREIGN PATENTS

| | | |
|---|---|---|
| 27,255 | Great Britain | Dec. 15, 1908 |